United States Patent
Bhardwaj et al.

(10) Patent No.: US 8,592,065 B2
(45) Date of Patent: Nov. 26, 2013

(54) RECHARGEABLE BATTERY WITH A JELLY ROLL HAVING MULTIPLE THICKNESSES

(75) Inventors: Ramesh C. Bhardwaj, Fremont, CA (US); Taisup Hwang, Santa Clara, CA (US); Richard M. Mank, Sunnyvale, CA (US); John Raff, Menlo Park, CA (US)

(73) Assignee: Apple Inc., Cupertino, CA (US)

(*) Notice: Subject to any disclaimer, the term of this patent is extended or adjusted under 35 U.S.C. 154(b) by 334 days.

(21) Appl. No.: 12/938,182

(22) Filed: Nov. 2, 2010

(65) Prior Publication Data

US 2012/0107654 A1 May 3, 2012

(51) Int. Cl.
*H01M 6/10* (2006.01)
*H01M 4/13* (2010.01)

(52) U.S. Cl.
USPC ............................................ 429/94; 429/209

(58) Field of Classification Search
USPC .................. 429/94, 99, 152–154, 163
See application file for complete search history.

(56) References Cited

U.S. PATENT DOCUMENTS

| | | | |
|---|---|---|---|
| 2001/0005561 A1 | 6/2001 | Yamada et al. | |
| 2001/0019795 A1 | 9/2001 | Yoshida et al. | |
| 2004/0119442 A1* | 6/2004 | Lee et al. | 320/112 |
| 2006/0154145 A1 | 7/2006 | Lee et al. | |

FOREIGN PATENT DOCUMENTS

| | | |
|---|---|---|
| EP | 1569252 A1 | 8/2005 |
| WO | 2010022669 A1 | 4/2010 |

* cited by examiner

*Primary Examiner* — Patrick Ryan
*Assistant Examiner* — Muhammad Siddiquee
(74) *Attorney, Agent, or Firm* — Park, Vaughan, Fleming & Dowler LLP; Chia-Hsin Suen

(57) ABSTRACT

The disclosed embodiments relate to the design of a battery cell with multiple thicknesses. This battery cell includes a jelly roll enclosed in a pouch, wherein the jelly roll includes layers which are wound together, including a cathode with an active coating, a separator, and an anode with an active coating. The jelly roll also includes a first conductive tab coupled to the cathode and a second conductive tab coupled to the anode. The jelly roll is enclosed in a flexible pouch, and the first and second conductive tabs are extended through seals in the pouch to provide terminals for the battery cell. Furthermore, the battery cell has two or more thicknesses, wherein the different thicknesses are created by removing material from one or more of the layers before winding the layers together.

10 Claims, 8 Drawing Sheets

RECHARGEABLE BATTERY WITH A JELLY ROLL HAVING MULTIPLE THICKNESSES

BACKGROUND

1. Field

The present embodiments relate to batteries for portable electronic devices. More specifically, the present embodiments relate to the design of a battery cell containing a jelly roll having two or more thicknesses to facilitate efficient use of space within a portable electronic device.

2. Related Art

Rechargeable batteries are presently used to provide power to a wide variety of portable electronic devices, including laptop computers, tablet computers, mobile phones, personal digital assistants (PDAs), digital music players and cordless power tools. The most commonly used type of rechargeable battery is a lithium battery, which can include a lithium-ion or a lithium-polymer battery.

Lithium-polymer batteries often include cells that are packaged in flexible pouches. Such pouches are typically lightweight and inexpensive to manufacture. Moreover, these pouches may be tailored to various cell dimensions, allowing lithium-polymer batteries to be used in space-constrained portable electronic devices such as mobile phones, laptop computers, and/or digital cameras. For example, a lithium-polymer battery cell may achieve a packaging efficiency of 90-95% by enclosing rolled electrodes and electrolyte in an aluminized laminated pouch. Multiple pouches may then be placed side-by-side within a portable electronic device and electrically coupled in series and/or in parallel to form a battery for the portable electronic device.

However, efficient use of space may be limited by the use and arrangement of cells in existing battery pack architectures. In particular, battery packs typically contain rectangular cells of the same capacity, size, and dimensions. The physical arrangement of the cells may additionally mirror the electrical configuration of the cells. For example, a six-cell battery pack may include six lithium-polymer cells of the same size and capacity configured in a two in series, three in parallel (2s3p) configuration. Within such a battery pack, two rows of three cells placed side-by-side may be stacked on top of each other; each row may be electrically coupled in a parallel configuration and the two rows electrically coupled in a series configuration. Consequently, the battery pack may require space in a portable electronic device that is at least the length of each cell, twice the thickness of each cell, and three times the width of each cell.

Unfortunately, this common type of battery pack design may be unable to utilize free space in the portable electronic device that is outside of a rectangular space reserved for the battery pack. For example, a rectangular battery pack of this type may be unable to efficiently utilize free space that is non-rectangular and/or irregularly shaped.

SUMMARY

The disclosed embodiments relate to the design of a battery cell with multiple thicknesses. This battery cell includes a jelly roll enclosed in a pouch, wherein the jelly roll includes layers which are wound together, including a cathode with an active coating, a separator, and an anode with an active coating. The jelly roll also includes a first conductive tab coupled to the cathode and a second conductive tab coupled to the anode. The jelly roll is enclosed in a flexible pouch, and the first and second conductive tabs are extended through seals in the pouch to provide terminals for the battery cell. Furthermore, the battery cell has two or more thicknesses, wherein the different thicknesses are created by removing material from one or more of the layers before winding the layers together.

In some embodiments, removing material from one or more of the layers involves removing the material from a side of the cathode or the anode to reduce the thickness of the jelly roll at the side. For example, material may be removed from the bottom of the cathode and/or anode to allow the battery cell to gradually decrease in thickness from top to bottom.

In some embodiments, the removed material corresponds to at least one of a rectangular strip, a diagonal strip, a stair-stepped shape, and a set of rectangular sections.

In some embodiments, the set of rectangular sections is removed so that after the jelly roll is wound, a corner of the jelly roll is retained.

In some embodiments, the two or more thicknesses are created to facilitate efficient use of space inside a portable electronic device.

BRIEF DESCRIPTION OF THE FIGURES

In the figures, like reference numerals refer to the same figure elements.

DETAILED DESCRIPTION

Figure 1:
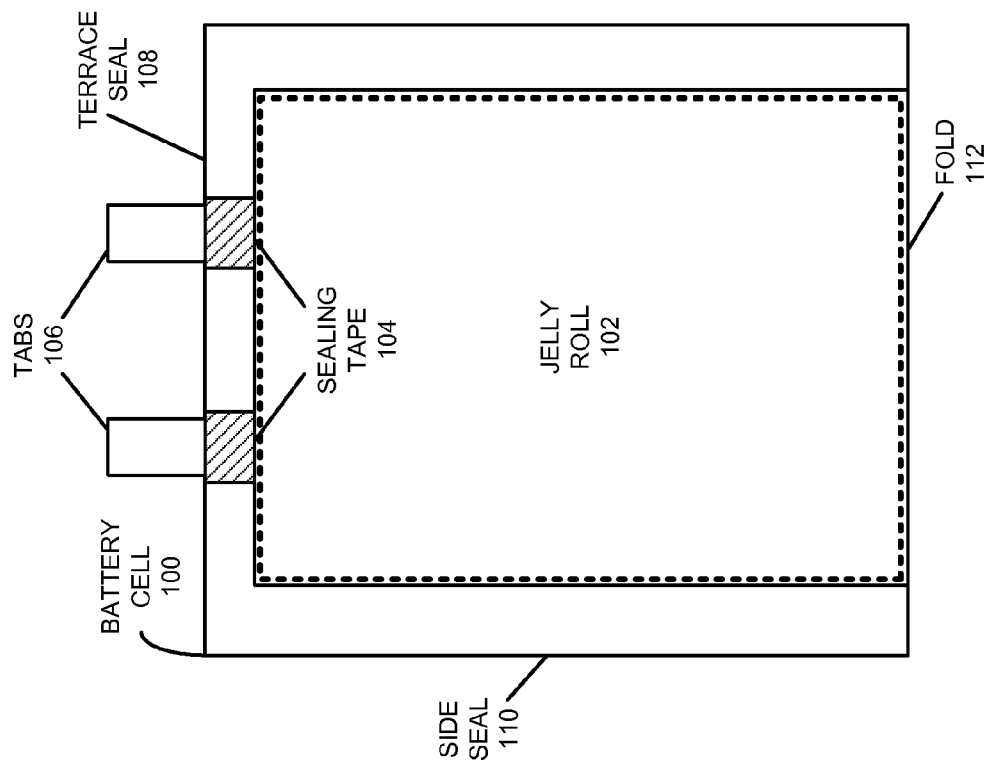
FIG. 1 shows a top-down view of a battery cell in accordance with an embodiment.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The disclosed embodiments relate to the design of a battery cell, which includes a jelly roll enclosed in a pouch. The jelly roll includes layers which are wound together, including a cathode with an active coating, a separator, and an anode with an active coating. The battery cell also includes a first conductive tab coupled to the cathode and a second conductive tab coupled to the anode. The first and second conductive tabs extend through seals in the pouch to provide terminals for the battery cell.

In addition, the battery cell may have a non-rectangular shape and/or design. The term "non-rectangular" can mean that the battery cell is not rectangular through any cutting plane, or in other words, that the battery cell is not rectangular when viewed from the top, bottom, and/or sides.

More specifically, the battery cell may include two or more thicknesses, which are created by removing material from one or more of the layers before winding the layers together. For example, the material may be removed from a side (e.g., bottom) of the anode and/or cathode to reduce the thickness of the jelly roll at the side. The removed material may correspond to a rectangular strip, a diagonal strip, a stair-stepped shape, and/or a set of rectangular sections. The two or more thicknesses may further facilitate efficient use of space inside a portable electronic device by, for example, accommodating a shape of the portable electronic device.

FIG. 1 shows a top-down view of a battery cell 100 in accordance with an embodiment. Battery cell 100 may correspond to a lithium-polymer cell that is used to power a portable electronic device. Battery cell 100 includes a jelly roll 102 containing a number of layers which are wound together, including a cathode with an active coating, a separator, and an anode with an active coating. More specifically, jelly roll 102 may include one strip of cathode material (e.g., aluminum foil coated with a lithium compound) and one strip of anode material (e.g., copper foil coated with carbon) separated by one strip of separator material (e.g., conducting polymer electrolyte). The cathode, anode, and separator layers may then be wound on a mandrel to form a spirally wound structure. Jelly rolls are well known in the art and will not be described further.

During assembly of battery cell 100, jelly roll 102 is enclosed in a flexible pouch, which is formed by folding a flexible sheet along a fold line 112. For example, the flexible sheet may be made of aluminum with a polymer film, such as polypropylene. After the flexible sheet is folded, the flexible sheet can be sealed, for example by applying heat along a side seal 110 and along a terrace seal 108.

Jelly roll 102 also includes a set of conductive tabs 106 coupled to the cathode and the anode. Conductive tabs 106 may extend through seals in the pouch (for example, formed using sealing tape 104) to provide terminals for battery cell 100. Conductive tabs 106 may then be used to electrically couple battery cell 100 with one or more other battery cells to form a battery pack. For example, the battery pack may be formed by coupling the battery cells in a series, parallel, or series-and-parallel configuration. The coupled cells may be enclosed in a hard case to complete the battery pack, or the coupled cells may be embedded within the enclosure of a portable electronic device, such as a laptop computer, tablet computer, mobile phone, personal digital assistant (PDA), digital camera, and/or portable media player.

In one or more embodiments, jelly roll 102 includes two or more thicknesses. The two or more thicknesses may be created by removing material from one or more of the layers before winding the layers together. As discussed in further detail with respect to FIGS. 2-6, the presence of two or more thicknesses facilitates efficient use of space inside the portable electronic device.

Figure 2:
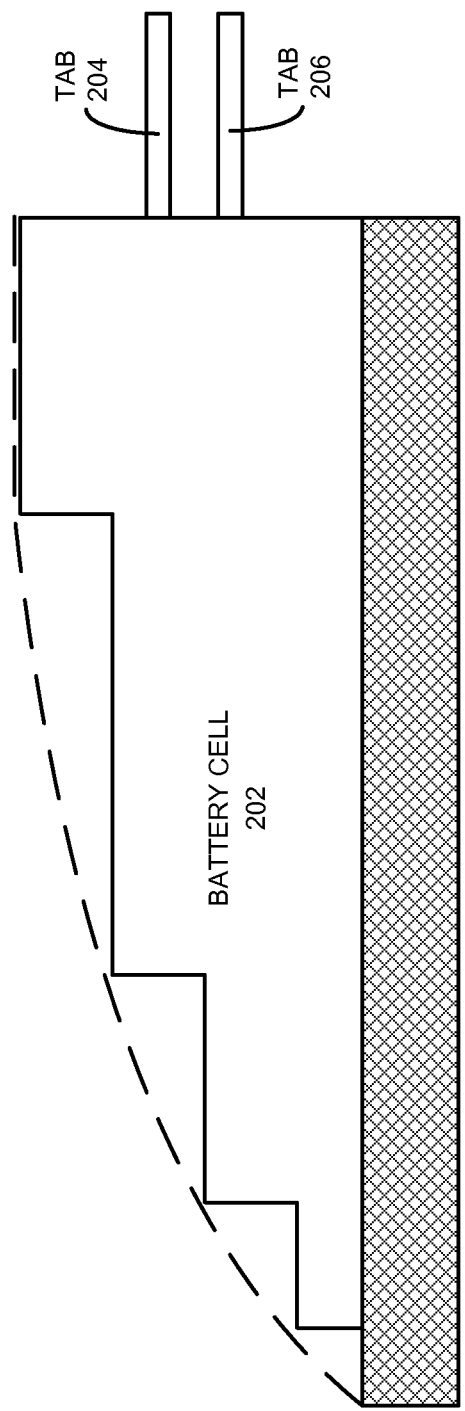
FIG. 2 shows a cross-sectional view of a battery cell in accordance with an embodiment.

FIG. 2 shows a cross-sectional view of a battery cell 202 in accordance with an embodiment. Battery cell 202 may be formed by winding a number of layers (e.g., cathode, anode, separator) into a jelly roll and enclosing the jelly roll in a pouch. A first conductive tab 204 may be coupled to the cathode and a second conductive tab 206 to the anode of the jelly roll. The first and second conductive tabs 204-206 may extend through seals in the pouch to provide terminals for battery cell 202.

As shown in FIG. 2, battery cell 202 has four different thicknesses. In particular, battery cell 202 increases in thickness from left to right. The variation in thickness may allow battery cell 202 to fill up the free space within a portable electronic device. For example, battery cell 202 may be designed to take up a curved region of space inside a mobile phone, laptop computer, tablet computer, portable media, digital camera, and/or PDA. In other words, battery cell 202 may include an asymmetric and/or non-rectangular design that accommodates the shape of the portable electronic device. In turn, battery cell 202 may provide greater capacity, packaging efficiency, and/or voltage than rectangular battery cells in the same portable electronic device.

To create multiple thicknesses in battery cell 202, material may be removed from one or more of the layers before winding the layers together. In particular, material may be removed from a side of the cathode and/or anode to reduce the thickness of the jelly roll at the side. Removal of material to create jelly rolls of multiple thicknesses is discussed in further detail below with respect to FIGS. 3-6.

Figure 3:
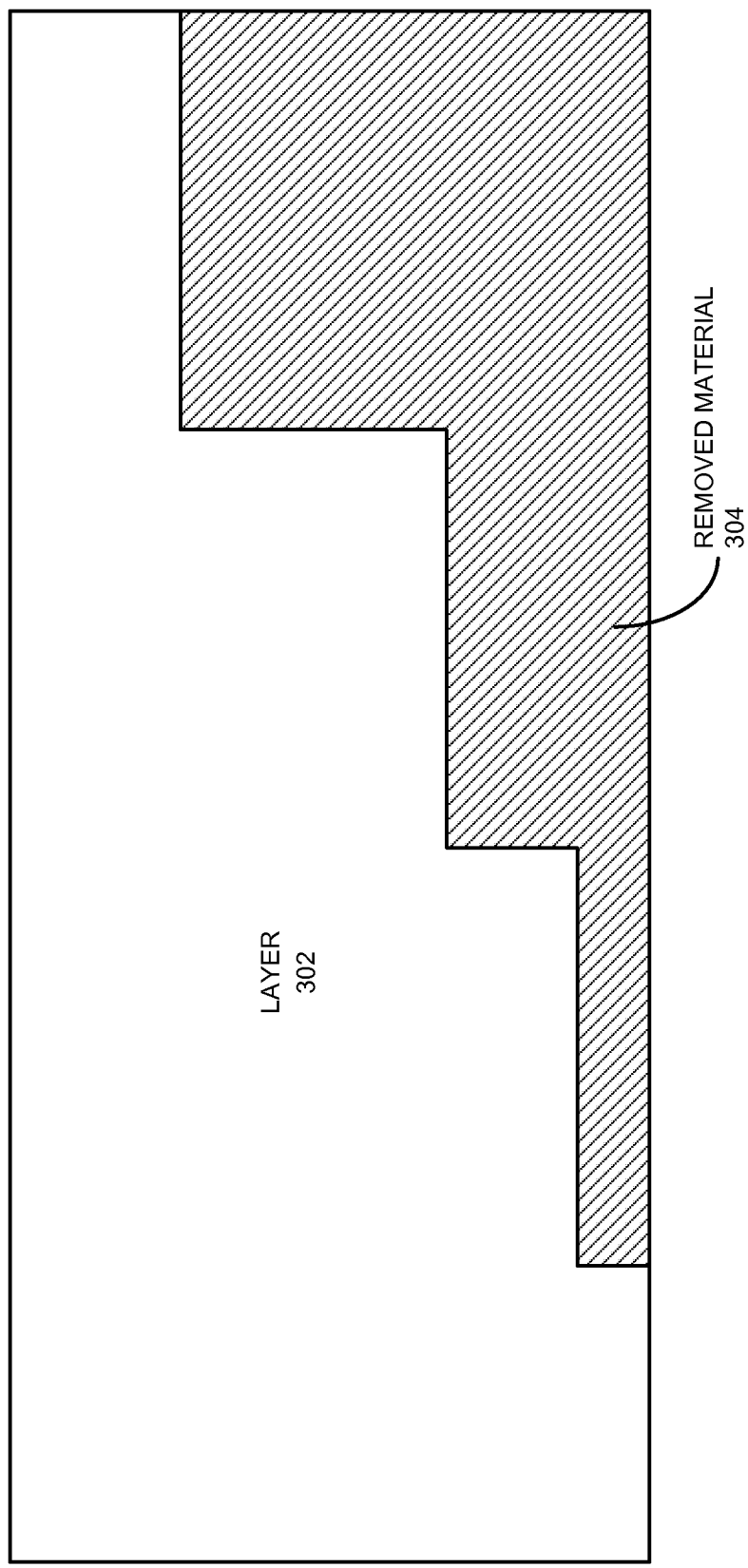
FIG. 3 shows a layer of a jelly roll in accordance with an embodiment.

FIG. 3 shows a layer 302 of a jelly roll in accordance with an embodiment. As discussed above, layer 302 may function as the cathode or anode of the jelly roll. In addition, a section of removed material 304 from layer 302 may create multiple thicknesses in the jelly roll. For example, removed material 304 may correspond to a stair-stepped shape that allows a battery cell of four different thicknesses (e.g., battery cell 202 of FIG. 2) to be created by winding layer 302 from left to right.

More specifically, material may be removed from the bottom of layer 302 to allow the battery cell to gradually decrease in thickness from top to bottom. To produce a greater change in thickness along the length of the battery cell, material may also be removed from other layers (e.g., cathode, anode, separator) in the jelly roll. For example, additional reductions in the battery cell's thickness may be achieved by removing material from both the cathode and anode of the jelly roll using a tab punch. A conductive tab may then be coupled to the top of layer 302 to provide a terminal for the battery cell.

Figure 4:
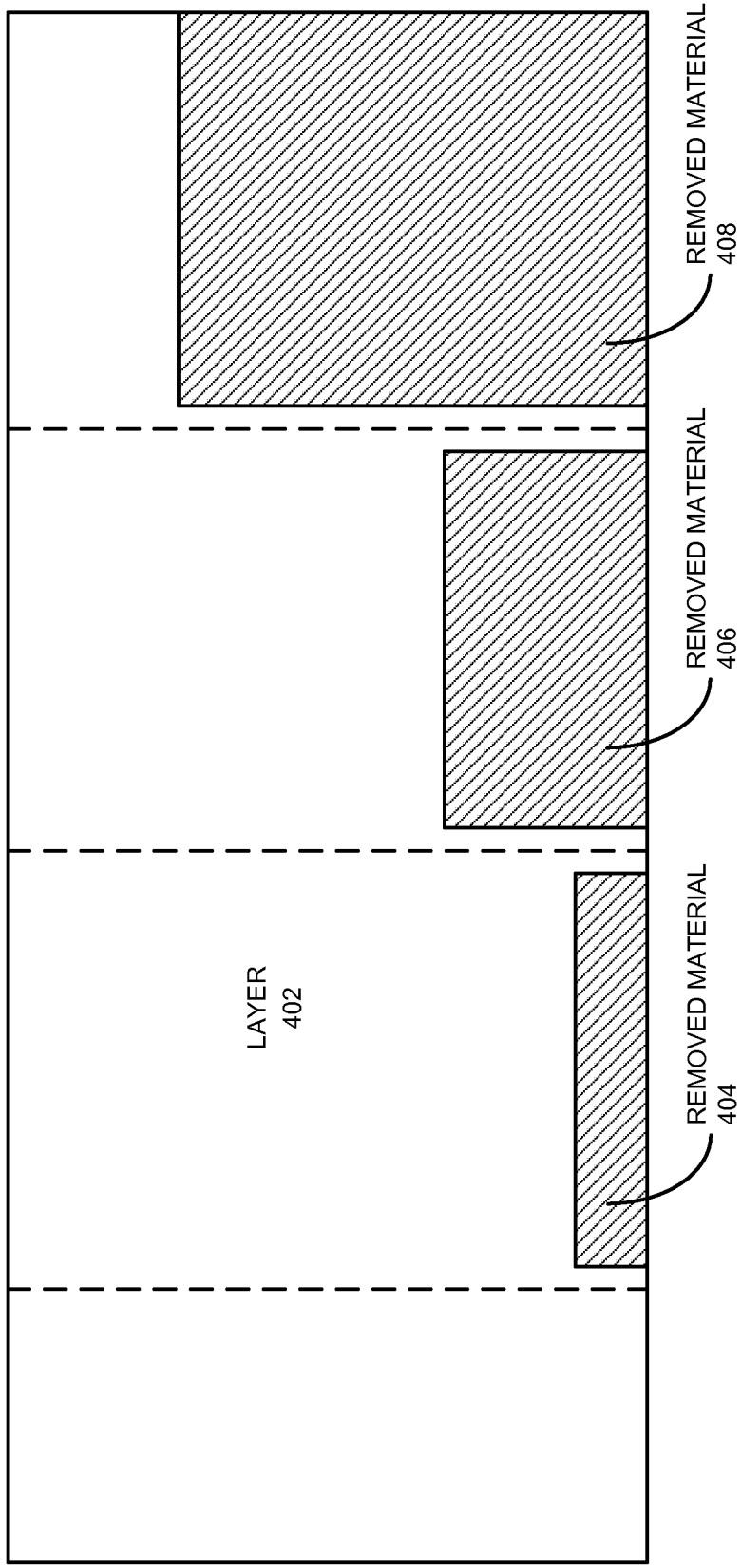
FIG. 4 shows a layer of a jelly roll in accordance with an embodiment.

FIG. 4 shows a layer 402 of a jelly roll in accordance with an embodiment. As with layer 302 of FIG. 3, layer 402 may be used to create a battery cell of four different thicknesses, such as battery cell 202 of FIG. 2. However, unlike layer 302, layer 402 includes three rectangular sections of removed material 404-408. The three sections may additionally be separated by two strips of material from layer 402 that reach the bottom of the jelly roll. In other words, sections of removed material 404-408 may be cut from the bottom of layer 402 in a way that leaves gaps of material in between the sections.

Such gaps of material may allow corners of the jelly roll to be retained after the jelly roll is wound. For example, the jelly roll may be created by folding along the dotted lines as layer 402 is wound from left to right. Such folding may utilize the gaps of material in reinforcing the bottom corners of the jelly roll. In turn, retention of the bottom corners may prevent the corners from folding or pinching during the assembly of the battery cell and/or the installation of the battery cell in a portable electronic device.

Figure 5:
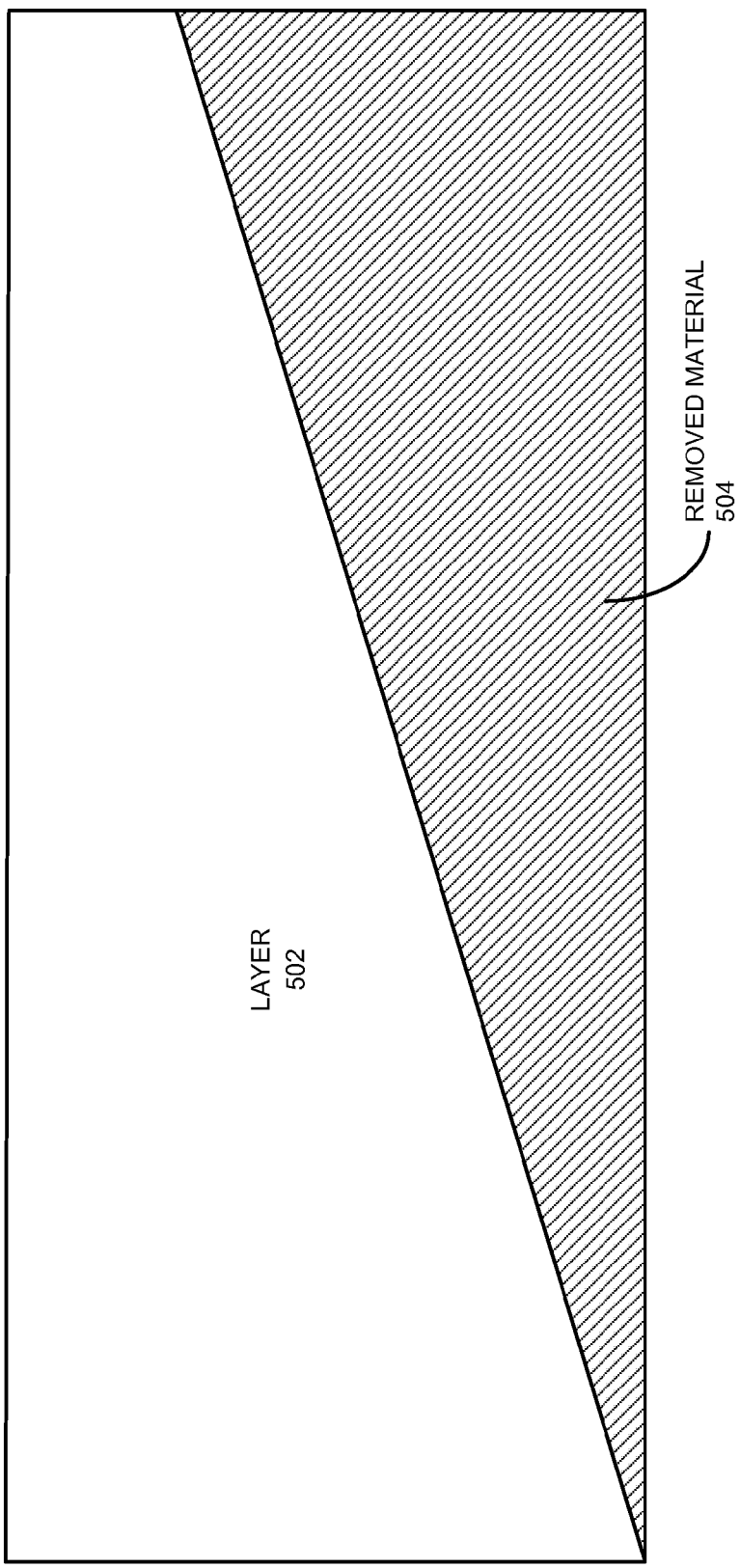
FIG. 5 shows a layer of a jelly roll in accordance with an embodiment.

FIG. 5 shows a layer 502 of a jelly roll in accordance with an embodiment. Layer 502 includes a diagonal (e.g., triangular) strip of removed material 504. As a result, a battery cell created by winding layer 502 from left to right may be of uniform, maximum thickness at the top, then taper continuously to a minimum thickness at the bottom. The battery cell may thus accommodate a portable electronic device with a curved or sloping enclosure.

Figure 6:
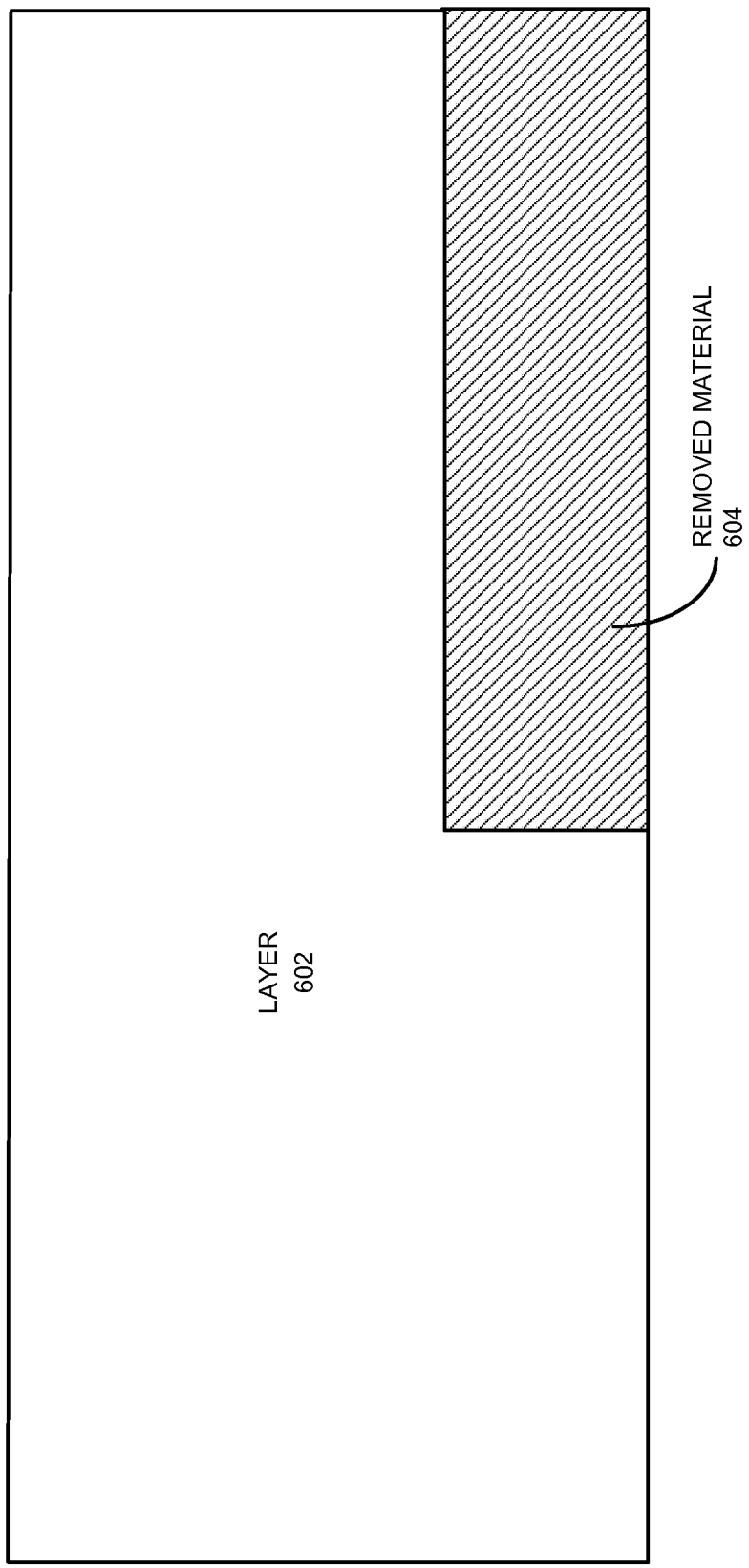
FIG. 6 shows a layer of a jelly roll in accordance with an embodiment.

FIG. 6 shows a layer 602 of a jelly roll in accordance with an embodiment. A rectangular strip of removed material 604 along the bottom of layer 602 may enable the creation of a non-rectangular battery cell with two different thicknesses. The shape of the battery cell may further allow the battery cell to accommodate components inside a portable electronic device and/or utilize free space within a curved enclosure for the portable electronic device.

Figure 7:
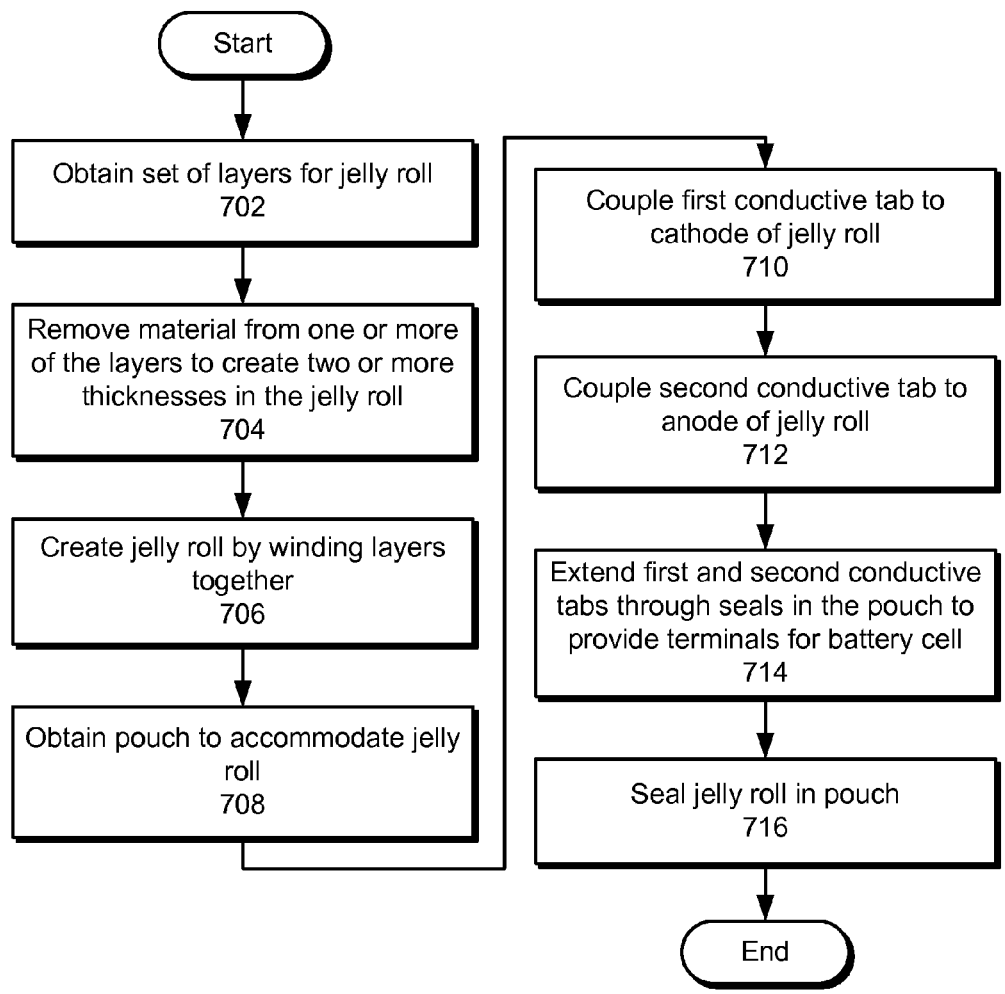
FIG. 7 shows a flowchart illustrating the process of manufacturing a battery cell in accordance with an embodiment.

FIG. 7 shows a flowchart illustrating the process of manufacturing a battery cell in accordance with an embodiment. In one or more embodiments, one or more of the steps may be omitted, repeated, and/or performed in a different order. Accordingly, the specific arrangement of steps shown in FIG. 7 should not be construed as limiting the scope of the embodiments.

First, a set of layers for a jelly roll is obtained (operation 702). The layers may include a cathode with an active coating, a separator, and an anode with an active coating. Next, material is removed from one or more of the layers to create two or more thicknesses in the jelly roll (operation 704). The removed material may correspond to a rectangular strip, a diagonal strip, a stair-stepped shape, and/or a set of rectangular sections. For example, a rectangular strip of material may be cut from the bottom of the cathode and/or anode to reduce the thickness of the jelly roll at the bottom. Alternatively, a set of rectangular sections may be removed from the bottom so that retain one or more corners of the jelly roll are retained after the jelly roll is wound.

The jelly roll is then created by winding the layers together (operation 706). For example, the layers may be wound onto a flat mandrel to create a jelly roll with a flattened shape. The flattened shape and/or multiple thicknesses of the jelly roll may allow the battery cell to accommodate components inside a portable electronic device and/or fit within a curved enclosure for the portable electronic device.

To assemble the battery cell, a pouch to accommodate the jelly roll is obtained (operation 708). Next, a first conductive tab is coupled to the cathode of the jelly roll (operation 710), and a second conductive tab is coupled to the anode of the jelly roll (operation 712). The first and second conductive tabs are extended through seals in the pouch to provide terminals for the battery cell (operation 714). Finally, the jelly roll is sealed in the pouch (operation 716). For example, the jelly roll may be sealed by spot welding and/or applying heat to the seals.

Figure 8:
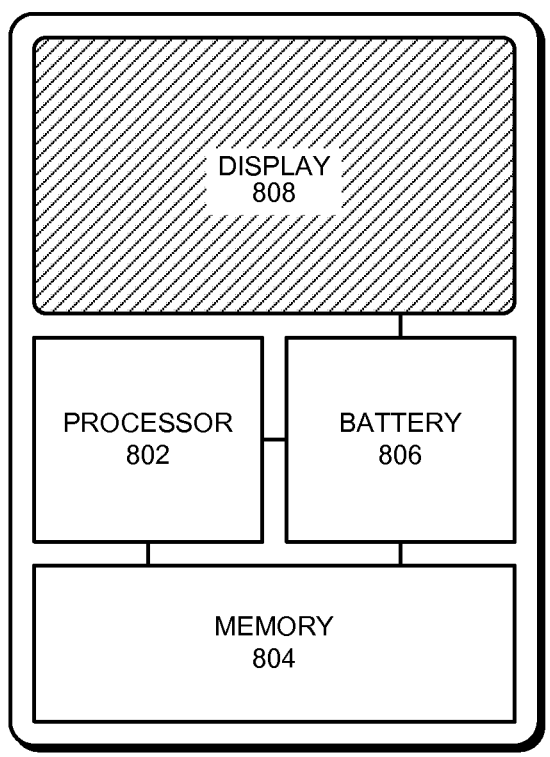
FIG. 8 shows a portable electronic device in accordance with an embodiment.

The above-described rechargeable battery cell can generally be used in any type of electronic device. For example, FIG. 8 illustrates a portable electronic device 800 which includes a processor 802, a memory 804 and a display 808, which are all powered by a battery 806. Portable electronic device 800 may correspond to a laptop computer, tablet computer, mobile phone, PDA, portable media player, digital camera, and/or other type of battery-powered electronic device. Battery 806 may correspond to a battery pack that includes one or more battery cells. Each battery cell may include a jelly roll of two or more thicknesses. The two or more thicknesses may facilitate efficient use of space inside portable electronic device 800. For example, a reduced thickness at one end of the battery cell may allow battery 806 to fit along the edge of a tablet computer with a scalloped shape.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A battery cell, comprising:
a jelly roll that varies in thickness, comprising layers which are wound together, including a cathode with an active coating, a separator, and an anode with an active coating;
wherein the anode comprises a sheet having a length in a direction of winding, a width perpendicular to the direction of winding and a thickness, wherein the width of the anode tapers in a stepped pattern along the length of the anode;
wherein the cathode comprises a sheet having a length in a direction of winding, a width perpendicular to the direction of winding and a thickness, wherein the width of the cathode tapers in a stepped pattern along the length of the cathode; and
wherein after the jelly roll is formed by winding the layers together, the jelly roll varies in thickness in a stepped pattern in a direction along an axis of winding.

2. The battery cell of claim 1, further comprising:
a pouch enclosing the jelly roll, wherein the pouch is flexible.

3. The battery cell of claim 2, further comprising:
a first conductive tab coupled to the cathode; and
a second conductive tab coupled to the anode,
wherein the first and second conductive tabs extend through seals in the pouch to provide terminals for the battery cell.

4. The battery cell of claim 1, wherein the variation in thickness of the jelly roll facilitates efficient use of space inside a portable electronic device.

5. A battery pack, comprising a set of cells, wherein each of the cells comprises:
a jelly roll that varies in thicknesses, comprising layers which are wound together, including a cathode with an active coating, a separator, and an anode with an active coating;
wherein the anode comprises a sheet having a length in a direction of winding, a width perpendicular to the direction of winding and a thickness, wherein the width of the anode tapers in a stepped pattern along the length of the anode;

wherein the cathode comprises a sheet having a length in a direction of winding, a width perpendicular to the direction of winding and a thickness, wherein the width of the cathode tapers in a stepped pattern along the length of the cathode; and wherein after the jelly roll is formed by winding the layers together, the jelly roll varies in thickness in a stepped pattern in a direction along an axis of winding.

6. The battery pack of claim 5, wherein each of the cells further comprises:
   a pouch enclosing the jelly roll, wherein the pouch is flexible;
   a first conductive tab coupled to the cathode; and
   a second conductive tab coupled to the anode,
   wherein the first and second conductive tabs extend through seals in the pouch to provide terminals for the battery cell.

7. The battery pack of claim 5, wherein the variation in thickness of the jelly roll facilitates efficient use of space inside a portable electronic device.

8. A portable electronic device, comprising:
   a set of components powered by a battery pack; and
   the battery pack, comprising:
      a set of cells, wherein each of the cells comprises:
         a jelly roll that varies in thickness, comprising layers which are wound together, including a cathode with an active coating, a separator, and an anode with an active coating, wherein the anode comprises a sheet having a length in a direction of winding, a width perpendicular to the direction of winding and a thickness, wherein the width of the anode tapers in a stepped pattern along the length of the anode, wherein the cathode comprises a sheet having a length in a direction of winding, a width perpendicular to the direction of winding and a thickness, wherein the width of the cathode tapers in a stepped pattern along the length of the cathode, and wherein after the jelly roll is formed by winding the layers together, the jelly roll varies in thickness in a stepped pattern in a direction along an axis of winding.

9. The portable electronic device of claim 8, wherein each of the cells further comprises:
   a pouch enclosing the jelly roll, wherein the pouch is flexible;
   a first conductive tab coupled to the cathode; and
   a second conductive tab coupled to the anode,
   wherein the first and second conductive tabs extend through seals in the pouch to provide terminals for the battery cell.

10. The portable electronic device of claim 8, wherein the variation in thickness of each of the jelly rolls that comprise the battery pack facilitates fitting the battery pack into an irregular space in the portable electronic device.

* * * * *